3,102,112
MODIFICATION OF CELLULOSE WITH EPOXY-PROPYL AMINE COMPOUNDS

Mary E. Carter, Philadelphia, and Leland B. Ticknor, Media, Pa., assignors to American Viscose Corporation, Philadelphia, Pa., a corporation of Delaware
No Drawing. Filed Feb. 29, 1960, Ser. No. 11,433
8 Claims. (Cl. 260—212)

This invention relates to a method of improving cellulosic material. More particularly, it relates to a method of treating cellulosic material with an epoxy-amine compound and the product formed thereby.

It is often desirable to modify the physical appearance and properties of fibers and textiles manufactured partially or totally of cellulosic material. Treatment of rayon with alkali solutions is impractical because of solubility and loss of strength of the rayon. The alkali treatment of textiles composed of mixtures of rayon and cotton, or rayon and synthetic polymer fibers is likewise impractical even though the alkali may improve the dyeability, luster, tensile and water sorption properties of the second fiber component.

It is an object of the present invention to provide a method of modifying the chemical structural characteristics of cellulosic material to improve physical characteristics thereof.

It is a further object of this invention to provide a method for producing an alkali-insoluble regenerated cellulose article.

It is a still further object of this invention to provide a method for producing an improved cellulosic product with a reaction which does not require the use of a catalyst or employs a non-objectionable, easily handled catalyst.

In accordance with this invention an improved cellulosic product is formed by the reaction of a cellulosic material with an epoxypropyl amine having at least two available epoxy groups, at a pH of at least 6. It is essential to the invention that the epoxy amine compound have at least two epoxy groups available for reaction with the cellulose material; thus only tri(epoxypropyl) and di(epoxypropyl) amine are applicable and the tri(epoxypropyl) amine is preferred since it has the most available epoxy groups.

Cellulosic material includes cotton, linen, paper, woodpulp, cellulose esters and ethers, and regenerated cellulose material. The preferred cellulosic material is regenerated cellulose since the process is most valuable with its use.

Generally, the method is carried out by saturating the cellulose article with an aqueous solution of the prescribed epoxypropyl amine, drying, and allowing the resulting reaction to proceed to completion. In order to complete the reaction within a reasonable time, it is a preferred step to cure the epoxy amine saturated cellulose by heating to a temperature ranging from 75 to 160° C. and preferably from about 100 to about 150° C. for a period of from about 15° minutes to 24 hours and preferably from 1 hour to 16 hours.

The aqueous epoxypropyl amine solution, broadly speaking, has a concentration ranging from about 1 to 20% by weight and preferably from about 5 to 15%. The usual period for treating the cellulose article with the aqueous amine solution mainly depends on the physical characteristics of the article. For example, thin strands of cellulose fiber are saturated by passing them through a bath of the aqueous amine solution in a few moments. On the other hand, thicker, dry cellulose articles may require immersion in the aqueous amine solution for as much as about 30 minutes to effect complete saturation. It is an advantage of this invention that a cellulosic article can be saturated or impregnated with the aqueous amine solution and thereafter dried and stored without immediately curing with no significant degradation of the cellulose. In fact, a slow reaction between the cellulose material and the epoxy amine begins when the cellulose becomes impregnated. At any future time after storing, the cellulose article can be heated to complete the curing thereof thereby producing an improved alkali-insoluble cellulose article.

The process of this invention is advantageously carried out by curing in the presence of a catalyst although this is not at all essential to the invention. The reaction of the epoxide amine and cellulose material takes place at a pH of at least 6 requiring the use of basic catalysts, for example, sodium carbonate, sodium bicarbonate, calcium carbonate, secondary and tertiary phosphates, etc. Basic organic catalysts, for example, pyridine and aniline are useful. The inorganic catalysts are generally applied to the cellulose article in the form of aqueous solutions at concentrations of up to about 2%, preferably about 1%. The catalysts solution is applied either before, during or after saturating the cellulose with the epoxy amine and acts to greatly hasten the curing process so that curing periods of from about 5 minutes to about three hours are useful for curing temperatures ranging from 75 to 160° C. and preferably 100 to 150° C. Curing temperatures over 160° C. tend to degrade the cellulose material and temperatures under 75° C. are not substantially useful because of slowness of reaction.

It is essential to this invention that the epoxy amine compound have at least two epoxy groups available for reaction with the cellulose material. This prerequisite produces a sufficient modification within the cellulose molecular structure to produce an improved material with or without a non-objectionable basic catalyst. Generally, previously known cross-linking or polymerizing reagents for modifying cellulose required a catalyst of either acidic or basic nature. Such catalysts were objectionable for one or more reasons such as volatility, odor, water instability, toxicity and degradative effect on the cellulose. As an example, a commercially available diepoxy compound having the general formula

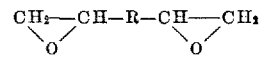

requires, as a catalyst, large amounts of zinc fluoroborate which decomposes during the curing to evolve harmful fluoride-containing gases. Both the diepoxy compound and zinc fluoroborate are handled with difficulty.

Illustrative of one method of preparing the specified epoxyalkyl amines is the following described procedure for the preparation of tri(2,3-epoxypropyl) amine.

To a vigorously stirred mixture of epichlorohydrin (118 g.) and water (80 ml.) in a water bath at 40° C., there was added over a period of 2½ hours an aqueous ammonia solution (30% by weight/volume) (320 ml.). During the addition, the temperature was not permitted to exceed 60° C. After all the ammonia had been added the mixture was stirred for one hour at 45–50° C. and then allowed to stand. A small upper aqueous layer separated and this was discarded. The residual water and vacuum distillation at 55° C., leaving a colorless syrupy residue.

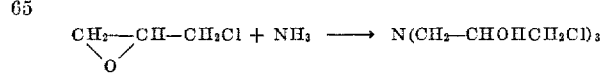

Tri(3-chloro-2-hydroxy propyl) amine

The above product, tri(3-chloro-2-hydroxypropyl) amine, was diluted with ethanol to a ratio of 1 to 1, and to this was added an ethanolic solution of sodium hydroxide. During this addition the reaction temperature was kept below 25° C. by external cooling. The pH of the mixture was then adjusted to phenolphthalein neutrality and the mixture was concentrated by partial removal of the alcohol under reduced pressure. The insoluble by-product, mainly sodium chloride, was filtered off to produce the desired product. Although the product was found to contain minor amounts of other material, presumably the di and mono(2,3-epoxypropyl) amine, the desired tri(epoxypropyl) amine was produced in sufficiently large proportion. The reaction formula for the second stage of the preparation is as follows:

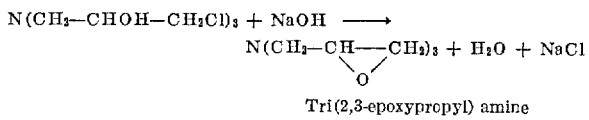

Tri(2,3-epoxypropyl) amine

The method for the preparation of tri(2,3-epoxypropyl) amine as set forth herein is well known and is similarly described in Belgian Patent No. 549,346.

Preparations of various alkali-insoluble cellulosic articles were made in the laboratory in accordance with this invention. In these preparations regenerated cellulose yarn (rayon) was subjected to the treating process under various conditions. The conditions of treatment with tri(2,3-epoxypropyl) amine are represented in the following tables.

*Table I*

| Sample No. | Aqueous Epoxy Amine Treatment | | Curing | |
|---|---|---|---|---|
| | Amine Conc., Percent | Time, Min. | Temp., °C. | Time, Hrs. |
| 1 | 10 | 15 | 130 | 1 |
| 2 | 10 | 30 | 130 | 1 |
| 3 | 10 | 15 | 100 | 16 |
| 4 | 10 | 30 | 100 | 16 |

All of the above samples were found to be insoluble in cuprammonium solution which was a positive indication of the occurrence of structural modification within the cellulose material. Cuprammonium insolubility indicates that the cellulose product is insoluble in and less sensitive to alkali solutions.

The following table sets forth the condition of treatment and curing of rayon yarn which was treated with a 1% aqueous solution of sodium carbonate as a catalyst.

*Table II*

| Sample No. | Aqueous Epoxy Amine Treatment | | Curing | |
|---|---|---|---|---|
| | Amine Conc., Percent | Time, Min. | Temp., °C. | Time, Min. |
| 5 (Control) | None | | 130 | 30 |
| 6 | 5 | 15 | 130 | 15 |
| 7 | 5 | 15 | 130 | 30 |
| 8 | 10 | 15 | 130 | 15 |
| 9 | 10 | 15 | 130 | 30 |
| 10 | 5 | 15 | 150 | 5 |
| 11 | 5 | 15 | 150 | 15 |
| 12 | 10 | 15 | 150 | 5 |
| 13 | 10 | 15 | 150 | 15 |
| 14 | 15 | 15 | 150 | 30 |
| 15 | 15 | 15 | 130 | 60 |

Samples Nos. 5, 6 and 8 above were found to be soluble in cuprammonium solution while all of the remaining samples were essentially insoluble. Samples 5 through 9 had been soaked in the 1% catalyst solution for 5 minutes prior to immersing samples 6 through 9 in the epoxy amine solution whereas the remaining samples had been subjected to the 1% catalyst solution by having the solution first mixed with the epoxy amine solution. Thus, the cellulose yarn was subjected to catalyst and amine solutions simultaneously for 15 minutes. With this difference in procedure and with a higher curing temperature, significant modification occurred in samples which were treated with solutions having lower epoxy amine concentrations and cured for a period as short as 5 minutes.

Samples numbered 5 (control), 10, 13, 14 and 15 along with an untreated rayon yarn were tested further for solubility. This solubility test involved placing a sample of each yarn, approximately 1 cm. long, 2200 denier thickness and containing 1200 filaments, in an aqueous solution of 8% sodium hydroxide (20 ml.) and cooling to 3–5° C. in an ice bath for two hours with frequent stirring. In this test, the untreated yarn and sample 5 (control yarn) dissolved. Sample 10, which had been catalytically treated with a low epoxy amine concentration and had been cured at 150° C. for only 5 minutes was highly swollen and perhaps partially dissolved. The remaining samples were swollen but insoluble in the solution. The sodium hydroxide concentration of the test solution was increased to approximately 12% and still no further solubility change was observed. The samples were placed in a deep freezer for 2 hours (ice crystals formed) and were then removed and allowed to warm to room temperature with frequent stirring. Again no further solubility changes were observed.

Further experimenting was done with the method of this invention to determine whether it could be used with rayon spinning equipment at reasonable production speeds. A treating bath consisting of 4–10% tri(2,3-epoxypropyl) amine in aqueous solution was installed in a conventional spinning machine subsequent to the regenerating bath so that the wet filament was run through the treating bath prior to drying. The speed of the machine was set at 50 m./min. It was found that some curing of the epoxy amine impregnated regenerated cellulose filament occurred during the drying procedure. After leaving the spinning machine, the yarn was cured at 130° C. for a period of 3 hours.

A test was devised to simulate the industrial mercerizing process. A 22–26% aqueous sodium hydroxide solution was used and the test yarns prepared on the spinning machine were held at constant length on small frames during the entire process. The frames of yarn were dipped into the caustic solution for 20 seconds. They were then washed with a steady stream of hot water until nearly neutral. To completely neutralize the yarns, a 2% sulfuric acid solution was applied. The yarns were then washed with cold water and dried in an oven at 70° C. The yarns demonstrated decrease in water retention and insolubility in cuprammonium solution.

Various changes and modifications may be made in practicing the invention without departing from the spirit and scope thereof and, therefore, the invention is not to be limited except as defined in the appended claims.

We claim:

1. An improved cellulosic product formed by the reaction of a cellulose material with a compound selected from the group consisting of di-(epoxypropyl) amine and tri-(epoxypropyl) amine.

2. The product of claim 1 wherein the cellulose material is an alkali-soluble cellulose material.

3. A method for preparing an improved cellulosic product which comprises saturating a cellulosic material with an aqueous solution of a compound selected from the group consisting of di-(epoxypropyl) amine and tri-(epoxypropyl) amine, said solution having a pH of at least 6, and allowing the resulting reaction to proceed to completion.

4. The method for producing an improved cellulosic product which comprises saturating a cellulosic material with an aqueous solution of a compound selected from the group consisting of di-(epoxypropyl) amine and tri-(epoxypropyl) amine, said solution having a pH of at least 6, and heating said material to a temperature of from 75 to 160° C. for a period of time ranging from about 15 minutes to 24 hours.

5. A method for producing an improved cellulosic product which comprises saturating a cellulosic material with an aqueous solution of a compound selected from the group consisting of di-(epoxypropyl) amine and tri-(epoxypropyl) amine, said solution having a pH of at least 6, and heating said cellulose article in the presence of a basic catalyst to a temperature ranging from about 75 to 150° C. for a period of time ranging from about 5 minutes to 3 hours.

6. The method of claim 5 wherein the basic catalyst is a sodium salt of carbonic acid.

7. The method of claim 5 wherein the basic catalyst is pyridine.

8. A method for producing an alkali-insoluble cellulosic product which comprises saturating an alkali-soluble cellulosic material with an aqueous solution of tri(2,3-epoxypropyl) amine having a pH of at least 6 and wherein the amine is present in a concentration of from about 5 to 15% by weight, treating said cellulosic material with an aqueous solution of a sodium salt of carbonic acid wherein the salt is present in a concentration of from about 0.5 to 2% by weight, heating the saturated, treated cellulosic material to a temperature ranging from about 110 to 130° C. for a period of time ranging from about 15 minutes to 3 hours.

References Cited in the file of this patent
UNITED STATES PATENTS

| | | |
|---|---|---|
| 2,664,360 | Charles et al. | Dec. 29, 1953 |
| 2,710,861 | Charles et al. | June 14, 1955 |

UNITED STATES PATENT OFFICE
CERTIFICATE OF CORRECTION

Patent No. 3,102,112                          August 27, 1963

Mary E. Carter et al.

It is hereby certified that error appears in the above numbered patent requiring correction and that the said Letters Patent should read as corrected below.

Column 2, line 13, for "epoxide" read -- epoxy --; line 62, after "water and" insert -- epichlorohydrin were removed from the product by --; column 4, line 20, for "both" read -- bath --

Signed and sealed this 25th day of February 1964.

(SEAL)
Attest:
ERNEST W. SWIDER

Attesting Officer

EDWIN L. REYNOLDS

Acting Commissioner of Patents